(12) United States Patent  (10) Patent No.: US 8,279,141 B2
Katoh et al.  (45) Date of Patent: Oct. 2, 2012

(54) DISPLAY DEVICE

(75) Inventors: Miki Katoh, Kariya (JP); Masahiro Kuno, Kariya (JP); Nagako Matsuno, Nagoya (JP)

(73) Assignee: Denso Corporation, Kariya (JP)

( * ) Notice: Subject to any disclaimer, the term of this patent is extended or adjusted under 35 U.S.C. 154(b) by 894 days.

(21) Appl. No.: 12/043,397

(22) Filed: Mar. 6, 2008

(65) Prior Publication Data

US 2008/0238818 A1    Oct. 2, 2008

(30) Foreign Application Priority Data

Mar. 27, 2007   (JP) ................. 2007-082710

(51) Int. Cl.
G09G 3/20   (2006.01)

(52) U.S. Cl. .......................... 345/56; 345/55

(58) Field of Classification Search .............. 345/55, 345/56, 61
See application file for complete search history.

(56) References Cited

FOREIGN PATENT DOCUMENTS

| DE | 101 28 437 | 1/2003 |
|---|---|---|
| JP | 11-20507 | 1/1999 |
| JP | 2003-137007 | 5/2003 |
| JP | 2004-045131 | 2/2004 |
| JP | 2004-144546 | 5/2004 |
| JP | 2006-021573 | 1/2006 |

OTHER PUBLICATIONS

German Office Action dated Sep. 2, 2010 issued in corresponding German Application No. 10 2008 015 257.9-41 with English Translation.

*Primary Examiner* — Srilakshmi K Kumar

(74) *Attorney, Agent, or Firm* — Nixon & Vanderhye P.C.

(57) ABSTRACT

A display device includes a display panel having a plurality of pixels in a form of matrix and a controller configured to control the plurality of pixels of the display panel so that an instrument image indicating an instrument is displayed on the display panel. The instrument image includes a scale image indicating a scale, and a pointer image indicating a pointer that is movable in accordance with an increase and decrease in a measured magnitude for indicating the measured magnitude in association with the scale image. The instrument image further includes a highlight image that is displayed in a predetermined pattern in accordance with at least one of a position and a motion of the pointer image.

12 Claims, 3 Drawing Sheets

DISPLAY DEVICE

CROSS REFERENCE TO RELATED APPLICATION

This application is based on Japanese Patent Application No. 2007-82710 filed on Mar. 27, 2007, the disclosure of which is incorporated herein by reference.

FIELD OF THE INVENTION

The present invention relates to a display device for displaying an instrument image indicating an instrument having a pointer.

BACKGROUND OF THE INVENTION

JP2006-21573A discloses a display device for a vehicle, which includes a display panel such as a liquid crystal panel in which a plurality of pixels is formed in the form of matrix. The display panel displays instrument images indicating instruments each having a pointer. In addition, the display panel displays a navigation image for indicating information, such as a peripheral road map and a current position of the vehicle on the road map, in a middle portion of the display panel and between the instrument images.

In a display device for displaying an instrument image such as an engine rotation speed meter, display conditions of pixels of a display panel are controlled in accordance with a measured magnitude, such as an engine rotation speed. The instrument image, for example, includes a scale image indicating a scale and a pointer image indicating a pointer for pointing the measured magnitude on the scale image. In an actual instrument, a pointer is moved along a front surface of a dial board on which a scale is formed. In the instrument image, on the other hand, the scale image and the pointer image are displayed on the same plane of the display panel. Therefore, an impression of motion of the pointer image is likely to be lower than that of the pointer of the actual instrument. Further, it will be difficult to recognize the motion of the pointer image and the measured magnitude pointed by the pointer image on the scale image. Such an issue will be raised not only in an instrument image in which a pointer image is moved in a rotation manner in accordance with an increase and decrease in the measured magnitude, but also in an instrument image in which a pointer image is moved in a simply linear direction, such as in a horizontal direction or a vertical direction.

SUMMARY OF THE INVENTION

The present invention is made in view of the foregoing matter and it is an object of the present invention to provide a display device which is capable of increasing the recognizability of an indication point indicated by a pointer image. It is another object of the present invention to provide a display device which is capable of increasing the recognizability of motion of the pointer image.

According to an aspect of the present invention, a display device includes a display panel having a plurality of pixels in a form of matrix and a controller configured to control the plurality of pixels of the display panel so that an instrument image indicating an instrument is displayed on the display panel. The instrument image includes a scale image indicating a scale, and a pointer image indicating a pointer that is movable in accordance with an increase and decrease in a measured magnitude for indicating the measured magnitude in association with the scale image. The instrument image further includes a highlight image that is displayed in a predetermined pattern in accordance with at least one of a position and a motion of the pointer image.

Accordingly, the motion of the pointer image is highlighted by the highlight image. Further, an indication position of the pointer image is accentuated by the highlight image. As such, the recognizability of the pointer image improves.

For example, the highlight image is displayed in a form of belt along the scale image and in a predetermined range of the scale image from a first position that coincides with the indication point or is adjacent to the indication point. In this case, the indication point indicated by the pointer image is accentuated by an end of the highlight image. Also, since the first position moves with the pointer image, the motion of the pointer image is accentuated.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EXEMPLARY EMBODIMENTS

Hereinafter, exemplary embodiments of the present invention will be described with reference to the accompanying drawings.

Figure 1:
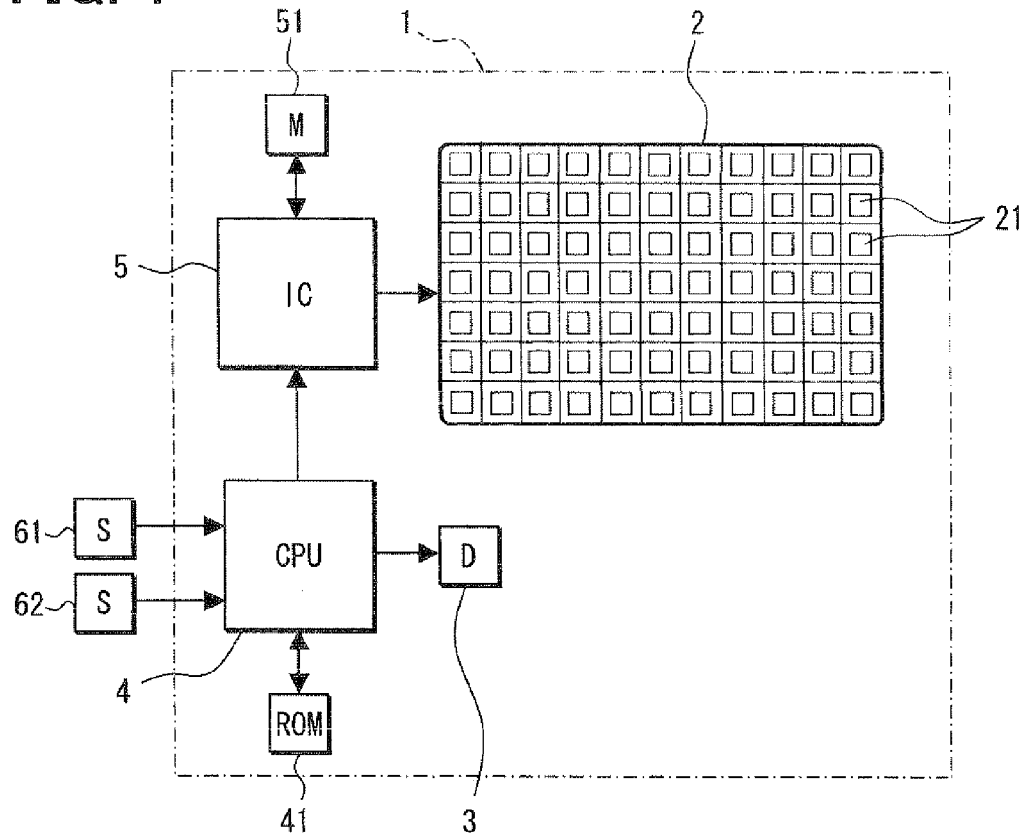
FIG. 1 is a circuit construction diagram of a display device according to an embodiment of the present invention.

Referring to FIG. 1, a display device 1 is used as, for example, a vehicular display device. The display device 1 is provided with a display panel 2, a light emitting diode 3, a controller such as a CPU (central processing unit) 4, a lithography IC (integral circuit) 5 and a ROM (read only memory) 41, and an image memory 51 for rewriting memory data.

The display panel 2 is, for example, a liquid crystal panel 2, and is formed with a plurality of pixels 21 in a matrix shape. The liquid crystal panel 2 is, for example, a liquid crystal panel of an active matrix system driven by a thin film transistor (TFT) (not shown). Each of the pixels 21 houses a red pixel, a green pixel and a blue pixel therein, and a voltage is applied to a gate of TFT to control a voltage applied to each of the red pixel, the green pixel and the blue pixel in the pixel 21, thereby controlling an optical transmittance of each of the red pixel, the green pixel and the blue pixel in the pixel 21.

The light emitting diode 3 emits white light, for example, when turned on by the CPU 4. The light emitting diode 3 is disposed behind the liquid crystal panel 2 as a light source for transmitting the light toward the liquid crystal display panel 2 and thereby illuminating the liquid crystal panel 2. When the liquid crystal display panel 2 is illuminated by the light emitting diode 3 in a condition that the optical transmittances of the red pixel, the green pixel and the blue pixel of each of the pixels 21 are controlled, a full color display is made on the liquid crystal panel 2.

CPU 4 receives signals from various sensors, such as a rotational sensor 61 and an indicator/warning sensor 62, and inputs the signals into the lithography IC 5. The rotational sensor 61 detects an engine rotation speed of a vehicle as a predetermined measured magnitude. The indicator/warning sensor 62 is provided for indicating an operating condition of a device equipped in the vehicle and/or warning of abnormality in the vehicle.

Image data for displaying images such as a rotation meter image 7 and a speed meter image 8 as instrument images and indicator/warning images 9, are stored in ROM 41. According to an instruction of CPU 4, the image data are transferred from ROM 41 to the image memory 51 and the lithography IC 5 controls a voltage applied to the red pixel, the green pixel and the blue pixel in each pixel 21 based upon the image data in the image memory 51 and the inputted predetermined measured magnitude or the indicator/warning information. As such, a display state of each of the plurality of the pixels 21 is controlled.

Figure 2:
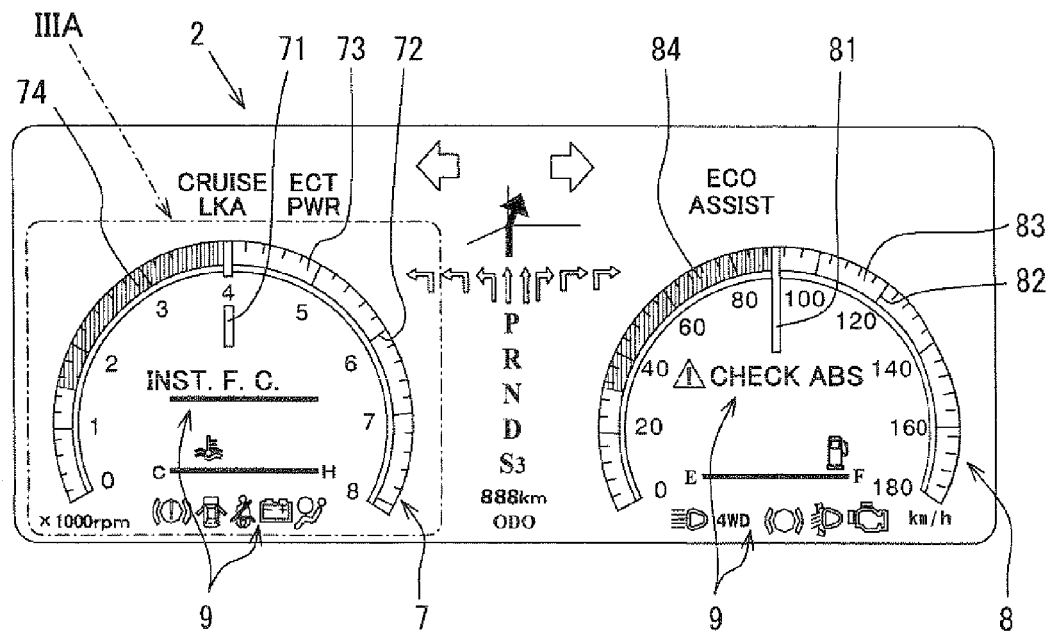
FIG. 2 is a front view of a liquid crystal panel of the display device according to the embodiment.

In this way, as shown in FIG. 2, the rotation meter image 7, the speed meter image 8, the indicator/warning images 9 and the like are displayed on the liquid crystal panel 2. The rotation meter image 7 is an image which indicates a rotation meter showing an engine rotational speed of the vehicle and is provided with a pointer image 71, a scale image 72, and a belt image 74 as a highlight image.

The pointer image 71 indicates a pointer that moves in accordance with an increase and decrease in the engine rotational speed for indicating the current engine rotational speed on the scale image 72. The scale image 72 indicates a scale to be pointed by the pointer. For example, the belt image 74 has a belt-like shape along the scale image 72. The belt image 74 is displayed on a scale area 73 in which the scale image 72 is displayed, in a predetermined display pattern in accordance with the motion of the pointer image 71.

The speed meter image 8 is an image indicating a speed meter for displaying a speed of the vehicle as a predetermined measured magnitude. Similar to the rotation meter image 7, the speed meter image 8 is provided with a pointer image 81, a scale image 82 and a belt-like image 84 as a highlight image. The pointer image 81 indicates a pointer that moves in accordance with an increase and decrease in the speed of the vehicle for indicating the current speed on the scale image 82. The scale image 82 indicates a scale to be pointed by the pointer. For example, the belt image 84 has a belt-like shape along the scale image 84. The belt image 84 is displayed on a scale area 83 in which the scale image 82 is displayed, in a predetermined pattern in accordance with the motion of the pointer image 81.

The indicator/warning images 9 include images indicating indicators, information (e.g., instant fuel consumption) and a warning (e.g., message "Check ABS! Please have dealer's inspection").

Hereinafter, the display pattern of the belt image 74, 84 will be described, in regard to the rotation meter image 7, as an example, with reference to FIGS. 3A to 3C. Data regarding the display pattern is stored in the ROM 41, for example.

Figure 3A:
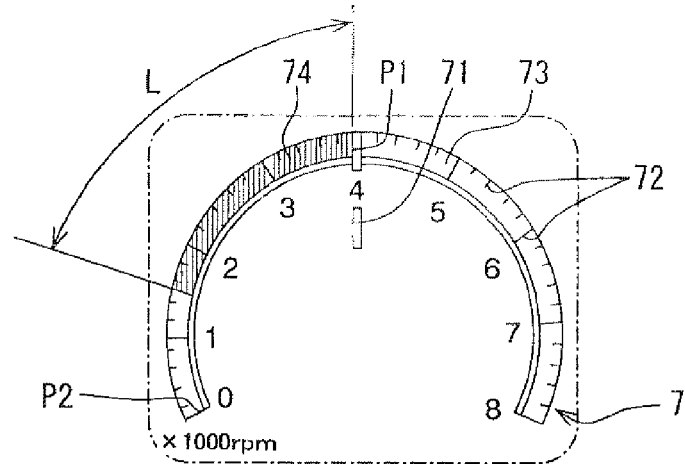
FIGS. 3A to 3C are enlarged front views of part IIIA of the liquid crystal panel, denoted by a dashed chain line in FIG. 2, for showing a display pattern of a highlight image of an instrument image.
Figure 3B:
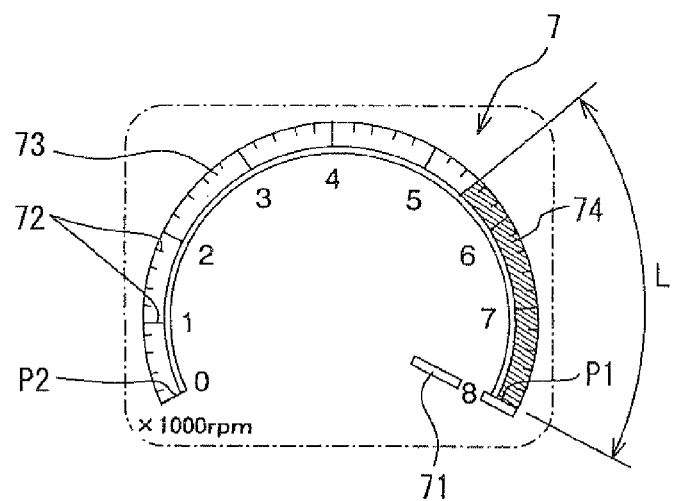
Figure 3C:
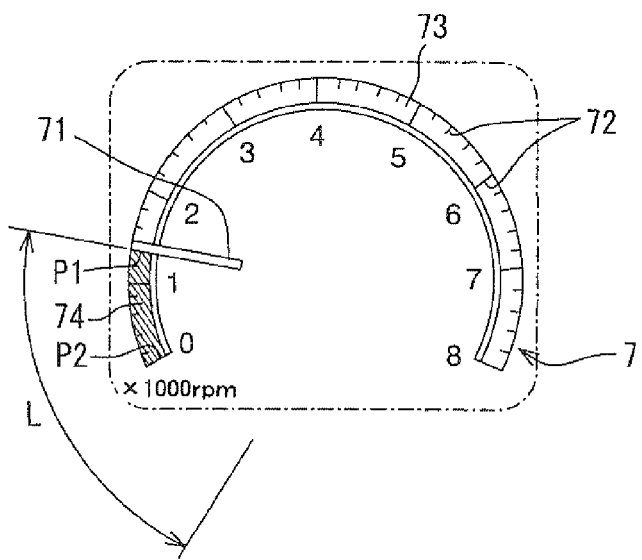

As shown in FIGS. 3A to 3C, the belt image 74 is displayed in a predetermined range (e.g., a predetermined length L) of the scale area 73 from a first position P1 along a direction in which the pointer image 71 moves in accordance with an increase and decrease in the engine rotation speed. In the present embodiment, the first position P1 coincides with an indication point pointed by the pointer image 71 on the scale image 72.

For example, the belt image 74 is displayed in the predetermined range of the scale area 73 on a decreasing side (e.g., left side in FIG. 3A) of the pointer image 71. The belt image 74 is displayed to extend from the first position P1 toward a second position P2 that corresponds to a minimum value of the scale image 72, such as "0", in a predetermined length. That is, the belt image 74 extends from the first position P1 in a decreasing direction, such as counterclockwise direction in FIG. 3A, in which the value of the scale image 72 decreases, in the predetermined length.

As described in the above, the pointer image 71 rotates, that is, makes a sweep motion along the scale image 72, in accordance with the increase and decrease in the engine rotation speed. The belt image 74 moves along the scale image 72, in synchronization with the pointer image 71. For example, when the pointer image 71 moves in an increasing direction, such as a clockwise direction in FIG. 3A in accordance with the increase in the engine rotation speed, the belt image 74 is displayed to follow the pointer image 71.

Accordingly, the motion of the pointer image 71 can be recognized as the motions of both the pointer image 71 and the belt image 74. That is, the motion of the pointer image 71 can be accentuated by the motion of the belt image 74. Therefore, the recognizability of the motion of the pointer image 71 is increased.

Since the belt image 74 is displayed in the predetermined range from the first position P1 along the scale image 72, the indication point indicated by the pointer image 71 is accented by the belt image 74. For example, when the pointer image 71 moves in the increasing direction, the position of the pointer image 71 is accented by a leading edge of the belt image 74. Accordingly, the indication point indicated by the pointer image 71 is easily recognized. As a result, the recognizability of both the indication point indicated by the pointer image 71 and the motion of the pointer image 71 is increased.

In the present embodiment, the belt image 74 is displayed to extend from the first position P1 on the decreasing side of the pointer image 71. The first position P1 coincides with the indication point indicated by the pointer image 71. Thus, the indication point indicated by the pointer image 71 is shown by the first position P1 that indicates the highest value in the range of the belt image 74. As such, in addition to the above effects, the rotation speed indicated by the pointer image 71 is further easily recognized.

When a distance between the first position P1 and the second position P2 is equal to or greater than the predetermined length L in the scale area 73, as shown in FIGS. 3A and 3B, the belt image 74 is displayed in the predetermined length L from the first position P1. On the other hand, when the distance between the first position P1 and the second position P2 is smaller than the predetermined length L in the scale area 73, as shown in FIG. 3C, the belt image 74 is displayed in a range between the first position P1 and the second position P2. In other words, the belt image 74 is displayed within the predetermined length L.

When the first position P1 moves to a predetermined position from the second position P2, that is, when the pointer image 71 moves to a predetermined position from the position of "0" as the increase in the engine rotation speed, the belt image 74 is displayed while changing its length from zero to the predetermined length L. In this case, the belt image 74 will be seen to grow from the second position P2, for example. Therefore, a dynamic impression is provided in accordance with the movement of the pointer image 71.

When the indication position, that is, the first position P1 moves to a position that is over the predetermined length L from the second position P2, the belt image 74 is displayed while maintaining the predetermined length L. In this case, the belt image 73 will be seen to follow the pointer image 71. Therefore, the motion of the pointer image 71 is recognized as the motions of the pointer image 71 and the belt image 74. In other words, the motion of the pointer image 71 is accentuated by the motion of the belt image 74. As a result, the recognizability of the motion of the pointer image 71 in accordance with the increase and decrease in the engine rotation speed is further increased.

In the example shown in FIG. 2, the indicator/warning images 9 are displayed in a central area of the rotation speed meter image 7, that is, in an area corresponding to a center of a rotation of the pointer image 71. Therefore, the pointer image 71 is not displayed in the central area of the rotation speed meter image 7, and thus the pointer image 71 has a length smaller than a radius of the rotation speed meter image 7. Since the pointer image 71 is displayed in accompanied with the belt image 74, the indication point of the pointer image 71 and the motion of the pointer image 71 are accentuated by the belt image 74, even when the pointer image 71 is short.

Figure 4:
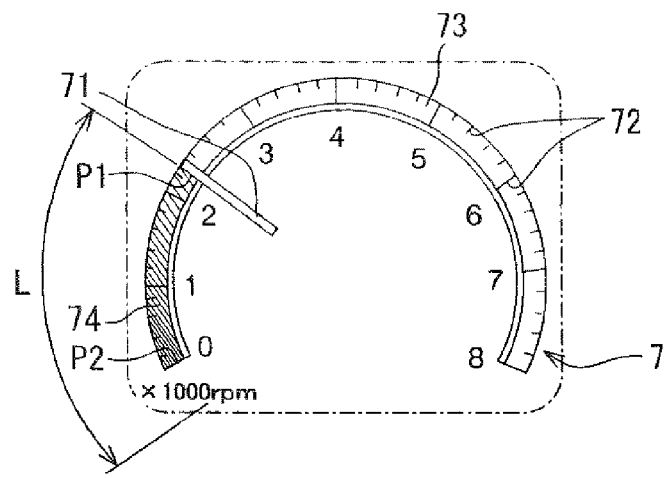
FIG. 4 is an enlarged front view of the part IIIA for showing a modification of the display pattern of the highlight image.

Further, as shown in FIG. 4, the belt image 74 can be displayed in a gradation manner in which a brightness gradually reduces as a function of distance from the first position P1, such as, in the decreasing direction from the first position P1. In this case, since the belt image 74 is accented by a graduation effect, the motion of the pointer image 71 is recognized as the motions of the belt image 71 and the pointer image 71. Accordingly, the above effects are further improved. Further, since the belt image 74 has the highest brightness at the first position P1, the indication point indicated by the pointer image 71 is further easily recognized.

In the case where the belt image 74 is displayed in the gradation manner, the belt image 74 can be displayed in the predetermined length L, similarly to the embodiment shown in FIGS. 3A to 3C. Alternatively, the belt image 74 can be displayed longer than the predetermined length L. For example, the belt image 74 can be displayed in a whole range from the second position P2 to the first position P1 in a gradation manner so that the brightness gradually increases from the second position P2 toward the first position P1.

Figure 5:
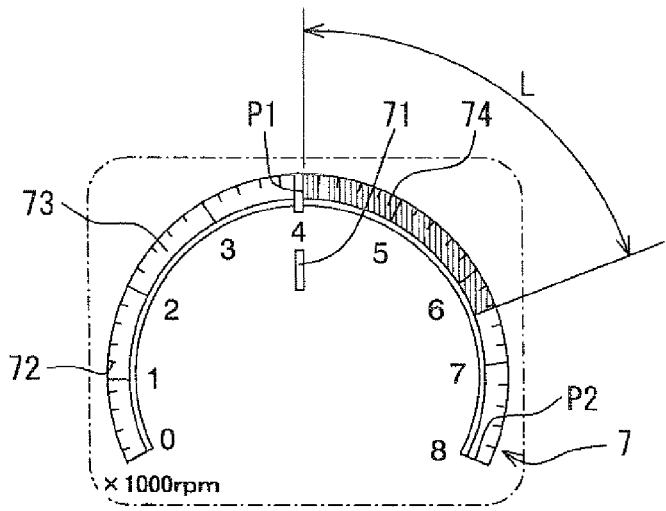
FIG. 5 is an enlarged front view of the part IIIA for showing another modification of the display pattern of the highlight image.

As shown in FIG. 5, the belt image 74 can be displayed on the increasing side of the pointer image 71. In this case, the second position P2 is, for example, designated to a position corresponding to the largest value of the scale image 72. Also in this case, the belt image 74 is displayed in the predetermined range. Further, the belt image 74 can be displayed in the gradation manner, similar to the embodiment shown in FIG. 4.

In the above embodiments, the highlight image 74 is displayed in the belt-like shape along the periphery of rotation speed meter 7. However, the shape of the belt image 74 is not limited to the belt-like shape. For example, the highlight image 74 can be displayed in another shape such as a substantially pie or fan shape, a dotted line shape, or the like. In the case where the highlight image 74 is displayed in the pie shape, the highlight image 74 is displayed also in the middle area of the rotation speed meter 7.

In the above embodiments, the instrument image is shown as a meter image in which the pointer image 71 rotates in accordance with the increase and decrease of the measured magnitude. However, the highlight image 74 displayed in the above discussed manners can be employed to any other instrument images. For example, the highlight image 74 can be employed to a meter image in which a pointer image is simply swept in a linear direction, as shown in FIG. 6.

Figure 6:
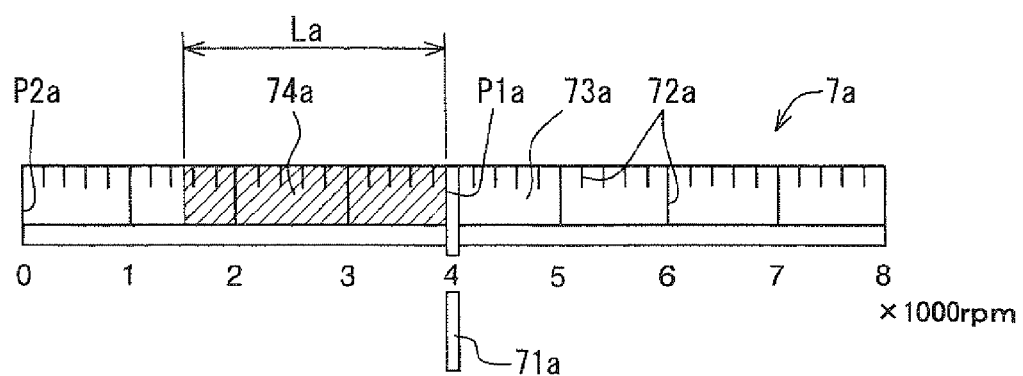
FIG. 6 is an enlarged front view of a meter image as a modification of the instrument image shown in FIG. 2.

In a meter image 7a shown in FIG. 6, a scale image 72a is displayed in the straight shape in a scale area 73a and a pointer image 71a is displayed to move along the scale image 72a, such as in a horizontal direction in accordance with the increase and decrease in the engine rotation speed as the measured magnitude. Further, a belt image 74a as the highlight image is displayed in the belt-like shape in accordance with the movement of the pointer image 71a. Similar to the example shown in FIGS. 3A to 3C, the belt image 74a is displayed in the predetermined range from a first position P1a as the indication point indicated by the pointer image 71a. For example, the belt image 74a is displayed from the first position P1a in the decreasing direction, such as, in a leftward direction in FIG. 6. That is, the belt image 74a is displayed in the predetermined length La from the first position toward a second position P2a that corresponds to the minimum value in the scale image 72a, such as, a position corresponding to "0". Alternatively, the belt image 74a can be displayed on the increasing side of the pointer image 71, similar to the example shown in FIG. 5. Further, the belt image 74a can be displayed in the gradation manner, similar to the example shown in FIG. 4.

Further, the belt image 74, 74a can be employed to an instrument image in which a pointer image is moved in the different manner from those of the examples shown in FIGS. 3A to 4. For example, the belt image 74, 84 can be employed to an instrument image in which the pointer image is moved in an up and down direction.

In the above embodiments, the first position P1, P1a coincides with the indication point indicated by the pointer image 71, 71a. Alternatively, the first position P1, P1a can be designated at a position close to the indication point. That is, the first position P1, P1a can be slightly paced from the pointer image 71, 71a. The belt image 74, 74a can be displayed in the predetermined length L from the first position P1 that is close to the indication point. That is, the first position P1, P1a can be designated to one of the position that coincides with the indication point and the position that is close to the indication point.

Further, the predetermined length L is not limited to the illustrated length, but may be any other constant length.

The gradation display of the belt image 74 is not limited to the above example. For example, the belt image 74, 74a can be displayed in a gradation manner in which the brightness increases as a function of distance from the first position P1, P1a.

Furthermore, the highlight image 74, 74a can be displayed on both the increasing side and the decreasing side of the pointer image 74, 74a. In this cases for example, the highlight image 74, 74a is displayed such that the brightness is the highest at the position of the pointer image 71, 71a.

In the above embodiments, the highlight image 74, 74a are, for example, displayed in the brightness higher than that of a peripheral portion such as the background, the scale image 72, 72a, and the like. In addition to or alternative to the above, the highlight image 74, 74a can be accented by being displayed with a color (e.g. hue) different from the color of other portions, such as the scale image 72, 72a, the pointer image 71, 71a, and the background. Namely, the highlight image 74, 74a can be displayed in various manner as long as the recognizability of the indication point and the motion of the pointer image 71, 71a is increased.

In the speed meter image 8, the belt image 84 is displayed in the similar manner as the belt image 74 of the rotation seed meter image 7. Thus, a description of the belt image 84 is omitted.

In the above embodiments, the highlight image 74, 74a, 84 is displayed in the predetermined pattern in accordance with at least one of the position and the motion of the pointer image 71, 71a, 81. Accordingly, the recognizability of both the indication point indicated by the pointer image 71, 71a, 81 and the motion of the pointer image 71, 71a, 81 is increased. Further, the above effects are provided without applying a large load to the lithography IC 5.

The display panel 2 can be constructed of a monochrome liquid crystal panel without a full color display. Further, instead of the liquid crystal panel as a light receiving type (non-light emitting type) display panel, the display panel 2 can be constructed of an EL (electro/luminescence) display panel as a light emitting type display panel. In addition, the display device 1 is not limited to the display device for the vehicle.

While only the exemplary embodiments have been chosen to illustrate the present invention, it will be apparent to those skilled in the art from this disclosure that various changes and modifications can be made therein without departing from the scope of the invention as defined in the appended claims. The above examples may be implemented with various combinations. Furthermore, the foregoing description of the preferred embodiments according to the present invention is provided for illustration only, and not for the purpose of limiting the invention as defined by the appended claims and their equivalents.

What is claimed is:

1. A display device comprising:
    a display panel having a plurality of pixels in a form of matrix; and
    a controller configured to control the plurality of pixels of the display panel so that an instrument image indicating an instrument is displayed on the display panel, the instrument image including a scale image indicating a scale, a pointer image indicating a pointer that is movable in accordance with an increase and decrease in a measured magnitude for indicating the measured magnitude in association with the scale image, wherein
    the instrument image further includes a belt-shaped highlight image having a predetermined length,
    the highlight image is displayed in a display area of the scale image in accordance with a position and increase and decrease motions of the pointer image,
    the highlight image is displayed to extend from a first position that is located on at least one of a position coinciding with an indication point indicated by the pointer image and a position adjacent to the indication point,
    when a distance between the first position and a second position that corresponds to one of a minimum value and a maximum value of the scale is less than the predetermined length, the highlight image is displayed in a range between the first position and the second position,
    when the distance between the first position and the second position is equal to or greater than the predetermined length, the highlight image is displayed while maintaining the predetermined length,
    wherein the predetermined length is a constant length.

2. The display device according to claim 1, wherein the first position moves with the pointer image.

3. The display device according to claim 1, wherein
    the highlight image is displayed on a lower value side of the scale with respect to the pointer image.

4. The display device according to claim 1, wherein
    the highlight image is displayed in a gradation manner in which a brightness of the highlight image varies as a function of distance from the first position.

5. The display device according to claim 4, wherein
    the highlight image is displayed in a gradation manner in which the brightness reduces as a function of distance from the first position.

6. The display device according to claim 1, wherein
    the highlight image is displayed on one of a lower value side of the scale and a higher value side of the scale with respect to the pointer image and to extend from the first position that coincides with the position of the pointer image, for accentuating the position and the motion of the pointer image.

7. The display device according to claim 6, wherein
    the highlight image is displayed in a brightness higher than that of a peripheral area.

8. The display device according to claim 1, wherein when the distance between the first position and the second position is greater than the predetermined length, the highlight image is displayed while maintaining the predetermined length.

9. The display device according to claim 1, wherein the predetermined length is less than a full length of the scale.

10. The display device according to claim 1, wherein the predetermined length is less than half of a full length of the scale.

11. The display device according to claim 1, wherein
    the highlight image is displayed on one side of the scale having values less than a mid-point of the scale with respect to the pointer image.

12. The display device according to claim 1, wherein
    the highlight image is displayed on one of a first side of the scale having values less than a mid-point of the scale and a second side of the scale having values higher than the mid-point of the scale and to extend from the first position that coincides with the position of the pointer image, for accentuating the position and the motion of the pointer image.

* * * * *